United States Patent
Fan

(10) Patent No.: US 10,338,425 B1
(45) Date of Patent: Jul. 2, 2019

(54) LIQUID CRYSTAL DISPLAY DEVICE AND ITS DISPLAY PANEL

(71) Applicant: HUIZHOU CHINA STAR OPTOELECTRONICS TECHNOLOGY CO., LTD., Huizhou Guangdong (CN)

(72) Inventor: Yong Fan, Huizhou Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 0 days.

(21) Appl. No.: 15/904,700

(22) Filed: Feb. 26, 2018

Related U.S. Application Data

(63) Continuation of application No. PCT/CN2018/073209, filed on Jan. 18, 2018.

Foreign Application Priority Data

Dec. 29, 2017 (CN) .......................... 2017 1 1484055

(51) Int. Cl.
| | |
|---|---|
| *G02F 1/1334* | (2006.01) |
| *G02F 1/1335* | (2006.01) |
| *G02F 1/1333* | (2006.01) |

(52) U.S. Cl.
CPC ...... *G02F 1/1334* (2013.01); *G02F 1/133553* (2013.01); *G02F 2001/133328* (2013.01); *G02F 2001/133507* (2013.01)

(58) Field of Classification Search
None
See application file for complete search history.

(56) References Cited

U.S. PATENT DOCUMENTS

| | | | | | |
|---|---|---|---|---|---|
| 3,861,783 | A | * | 1/1975 | Dill | ...................... G02F 1/1333 349/156 |
| 5,473,450 | A | * | 12/1995 | Yamada | ............ G02F 1/133377 349/84 |
| 5,576,866 | A | * | 11/1996 | Yamada | ............ G02F 1/133377 349/155 |

(Continued)

FOREIGN PATENT DOCUMENTS

| | | |
|---|---|---|
| CN | 101174050 A | 5/2008 |
| CN | 106094387 A | 11/2016 |

(Continued)

*Primary Examiner* — James A Dudek
(74) *Attorney, Agent, or Firm* — Hauptman Ham, LLP

(57) ABSTRACT

A liquid crystal display device and its display panel are provided. The display panel includes a first substrate, a second substrate, a PDLC layer and a plurality of gridwall structures. The first substrate and the second substrate are opposite to each other. The PDLC layer and the plurality of gridwall structures are located between the first substrate and the second substrate. The plurality of gridwall structures are spaced from each other and disposed in the PDLC layer. Each gridwall structure includes a transparent gridwall and a film structure covering the surface of the transparent gridwall. The refractivity of any two adjacent film layers of the first to Nth are different, and the reflectivity of one surface of the film structure facing the transparent gridwall is higher than the reflectivity of one surface of the film structure facing away from the transparent gridwall.

18 Claims, 1 Drawing Sheet

(56) References Cited

U.S. PATENT DOCUMENTS

| | | | | |
|---|---|---|---|---|
| 5,621,553 A | * | 4/1997 | Nishiguchi | G02F 1/133377 349/153 |
| 5,625,473 A | * | 4/1997 | Kondo | G02F 1/133377 349/153 |
| 5,627,665 A | * | 5/1997 | Yamada | G02F 1/133377 349/156 |
| 5,699,135 A | * | 12/1997 | Hisatake | G02F 1/133504 349/106 |
| 5,706,067 A | * | 1/1998 | Colgan | G02F 1/133553 349/114 |
| 6,069,674 A | * | 5/2000 | Aomori | G02F 1/13318 345/81 |
| 6,184,619 B1 | * | 2/2001 | Yamazaki | H01J 9/185 313/292 |
| 6,566,794 B1 | * | 5/2003 | Miyazaki | H01J 29/028 313/238 |
| 6,657,368 B1 | * | 12/2003 | Kosaka | H01J 29/028 313/292 |
| 6,856,360 B1 | * | 2/2005 | Higuchi | G02F 1/133553 349/110 |
| 7,468,766 B1 | * | 12/2008 | Colgan | G02F 1/133553 349/110 |
| 8,077,286 B2 | * | 12/2011 | Takeda | G02F 1/133509 349/106 |
| 10,209,552 B2 | * | 2/2019 | Lan | G02F 1/1334 |
| 2002/0167273 A1 | * | 11/2002 | Moon | H01J 61/305 313/582 |
| 2004/0105056 A1 | * | 6/2004 | Iida | G02F 1/133553 349/113 |
| 2006/0038937 A1 | * | 2/2006 | Kaneko | G02F 1/133512 349/110 |
| 2008/0088774 A1 | * | 4/2008 | Fan Jiang | G02F 1/133753 349/114 |
| 2008/0117346 A1 | * | 5/2008 | Jepsen | G02F 1/133555 349/42 |
| 2008/0123030 A1 | * | 5/2008 | Song | G02F 1/13394 349/110 |
| 2008/0239198 A1 | * | 10/2008 | Kim | G02F 1/1334 349/62 |
| 2009/0122242 A1 | * | 5/2009 | Nakamura | G02F 1/133512 349/110 |
| 2010/0014032 A1 | * | 1/2010 | Jepsen | G02F 1/133514 349/114 |
| 2010/0053727 A1 | * | 3/2010 | Lee | G02B 26/02 359/295 |
| 2010/0195188 A1 | * | 8/2010 | Huang | G02F 1/167 359/296 |
| 2010/0309413 A1 | * | 12/2010 | Jang | G02F 1/1334 349/86 |
| 2011/0147831 A1 | * | 6/2011 | Steigerwald | H01L 21/823431 257/330 |
| 2013/0342798 A1 | * | 12/2013 | Miyake | G02F 1/133788 349/132 |
| 2014/0192285 A1 | * | 7/2014 | Shinkai | F21V 7/005 349/15 |
| 2014/0211309 A1 | * | 7/2014 | Li | G02B 5/04 359/485.06 |
| 2015/0212358 A1 | * | 7/2015 | Kashima | G02F 1/1334 349/33 |
| 2016/0091646 A1 | * | 3/2016 | Yoon | G02F 1/1334 349/86 |
| 2016/0231497 A1 | * | 8/2016 | Kato | G02B 6/0035 |
| 2017/0256210 A1 | * | 9/2017 | Kato | G09G 3/342 |
| 2018/0088434 A1 | * | 3/2018 | Liang | G02F 1/1362 |
| 2018/0373082 A1 | * | 12/2018 | Kitamura | E06B 5/00 |
| 2019/0004377 A1 | * | 1/2019 | Okuyama | G02F 1/133711 |
| 2019/0049801 A1 | * | 2/2019 | Liu | G02F 1/133514 |
| 2019/0056622 A1 | * | 2/2019 | Liu | G02F 1/133555 |
| 2019/0094577 A1 | * | 3/2019 | Fan | G02F 1/133514 |

FOREIGN PATENT DOCUMENTS

| | | |
|---|---|---|
| CN | 106990589 A | 7/2017 |
| JP | 2001-215517 A | 8/2001 |
| JP | 2004-198548 A | 7/2004 |
| JP | 2011-186079 A | 9/2011 |

* cited by examiner

LIQUID CRYSTAL DISPLAY DEVICE AND ITS DISPLAY PANEL

RELATED APPLICATIONS

The present application is a National Phase of International Application Number PCT/CN2018/073209, filed Jan. 18, 2018, and claims the priority of China Application No. 201711484055.4, filed Dec. 29, 2017.

FIELD OF THE DISCLOSURE

The disclosure relates to a display technical field, and more particularly to a liquid crystal display device and its display panel.

BACKGROUND

Polymer dispersed liquid crystal (PDLC) is a material prepared by mixing low molecular weight liquid crystal molecules and prepolymer under polymerization in certain conditions to form micron-sized liquid crystal droplets evenly dispersed in the polymer network, by using the dielectric anisotropy of liquid crystal molecules it has an electro-optic response property, and works mainly in a scattering state and a transparent state, by controlling the voltage to adjust its gray scale. The working principle of PDLC is that PDLC films cannot form a regular electric field without applying external voltage. The optical axis orientation of liquid crystal particles is random and disordered, the reflectivity does not match the reflectivity of the polymer, the incident light is seriously scattered, and the PDLC thin film is opaque or translucent. After an external voltage is applied, the optical axis of the liquid crystal particles is aligned perpendicular to the thin film surface, that is, consistent with the direction of the electric field. The reflectivity of the PDLC thin film substantially matches the reflectivity of the polymer, there is no obvious interface, a substantially uniform medium is formed so the incident light does not scatter, and the PDLC film is transparent. Therefore, when an external electric field is applied, the PDLC thin film has an optical switching characteristic, and its degree of transparency also increases along with a certain curve as the applied voltage increases.

Due to its good electro-optical properties, high sensitivity, wide dynamic range, high resolution and fast response, PDLC can save polarizer film, save cost and power consumption compared to existing VA or IPS LCDs. However, at this stage, the PDLC adopting traditional pixel design has disadvantages such as low contrast ratio. The contrast ratio can be improved by increasing the thickness of the liquid crystal layer. However, an increase of the thickness of the liquid crystal layer leads to a drastic increase of the driving voltage, thereby increasing the driving cost and power consumption, and even affecting the liquid crystal lifetime.

SUMMARY

In order to solve the shortcomings of the prior art, the present disclosure provides a liquid crystal display device and a display panel thereof, which can improve light energy utilization and contrast, reduce driving cost and power consumption, and prolong the service life of the liquid crystal.

The technical solution provided by the present disclosure is to provide a display panel. The display panel comprises a first substrate, a second substrate, a polymer dispersed liquid crystal layer and a plurality of gridwall structures. The first substrate and the second substrate are disposed opposite to each other, the polymer dispersed liquid crystal layer, the plurality of gridwall structures are disposed between the first substrate and the second substrate. The plurality of gridwall structures are spaced apart from each other in the polymer dispersed liquid crystal layer, and each of the gridwall structures comprises a transparent gridwall and a film structure covering a surface of the transparent gridwall. The film structure sequentially comprises a first to Nth film layers in a direction away from the transparent gridwall. The refractivity of any two adjacent film layers of the first to the Nth film layers are different, and the reflectivity of one surface of the film structure facing the transparent gridwall is higher than the reflectivity of one surface of the film structure facing away from the transparent gridwall.

Optionally, the reflectivity of one surface of the film structure facing the transparent gridwall is 80% to 99%.

Optionally, the reflectivity of one surface of the film structure facing away from the transparent gridwall is 0.3% to 15%.

Optionally, the transparent gridwall is perpendicular to the first substrate and the second substrate.

Optionally, the transparent gridwall has a trapezoidal cross-sectional shape.

Optionally, a material of the first film layer is metal.

Optionally, a material of the first film layer is one selected from the group consisting of aluminum, silver, gold and copper, and/or a thickness of the first film layer is greater than 30 nm.

Optionally, a material of the second to Nth film layers is a metal or an insulating material, and/or the metal is selected from the group consisting of molybdenum, titanium and tantalum, and the insulating material is nitride or oxide.

Optionally, a material of the transparent gridwall is polyimide or polystyrene.

The present disclosure further provides a liquid crystal display device, the liquid crystal display device comprises any one of the display panel as described above.

The film structure of the display panel provided by the present disclosure sequentially comprises a first to Nth film layers in a direction away from the transparent gridwall. The refractivity of any two adjacent film layers of the first to the Nth film layers are different, and the reflectivity of one surface of the film structure facing the transparent gridwall is higher than the reflectivity of one surface of the film structure facing away from the transparent gridwall. Since the reflectivity of one surface of the film structure facing the transparent gridwall is higher so that light incident thereon can be finally reflected to the PDLC layer to improve the light energy utilization rate, and the reflectivity of one surface of the film structure facing away from the transparent gridwall is relatively low so that the light incident on the PDLC layer absorbs light, increases the brightness difference of the display image in the scattering state and the transparent state, improves the contrast of the display image, reduces the driving cost and power consumption, and prolongs the duration of the LCD.

DETAILED DESCRIPTION OF PREFERRED EMBODIMENTS

Figure 1:
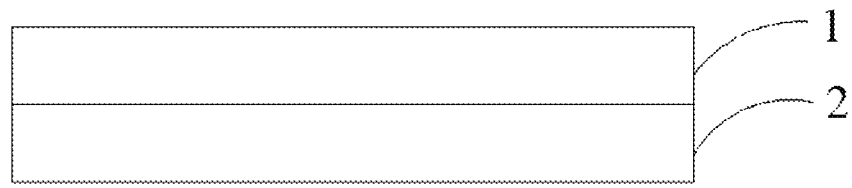
FIG. 1 is a schematic diagram of a display panel.

Hereinafter, embodiments of the present disclosure will be described in detail with reference to the accompanying drawings. However, the disclosure may be embodied in many different forms and should not be construed as limited to the specific embodiments set forth herein. Rather, these embodiments are provided to explain the principles of the disclosure and its practical application to thereby enable those of ordinary skill in the art to understand various embodiments of the disclosure and various modifications as are suited to the particular use contemplated. In the drawings, the same reference numerals will be used to refer to the same elements.

Figure 2:
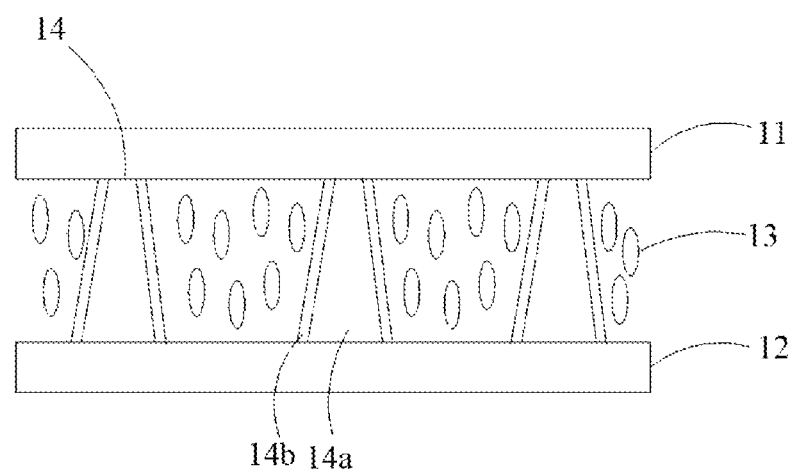
FIG. 2 is a schematic diagram of a liquid crystal display device.

Referring to FIG. 1 and FIG. 2, the liquid crystal display provided in this embodiment includes a display panel 1 and a backlight module 2. The display panel 1 is disposed above the backlight module 2. The backlight module 2 is configured to provide a light source for the display panel 1. The display panel 1 includes a first substrate 11, a second substrate 12, a PDLC layer 13 and a plurality of gridwall structures 14. The first substrate 11 and the second substrate 12 are opposite to each other. The PDLC layer 13 and the plurality of gridwall structures 14 are located between the first substrate 11 and the second substrate 12. The plurality of gridwall structures 14 are spaced from each other and disposed in the PDLC layer 13. Each gridwall structure 14 includes a transparent gridwall 14a and a film structure 14b covering the surface of the transparent gratin 14a. The film structure 14b sequentially includes first to Nth film layers in a direction away from the transparent gridwall 14a, and the refractivity of any two adjacent film layers of the first to the Nth film layers are different, and the reflectivity of one surface of the film structure 14b facing the transparent gridwall 14a is higher than the reflectivity of one surface of the film structure 14b facing away from the transparent gridwall 14a.

In this embodiment, the first substrate 11 is a CF substrate, the second substrate 12 is a TFT substrate, the first substrate 11 and the second substrate 12 are disposed opposite each other, and the PDLC layer 13 is encapsulated between the first substrate 11 and the second substrate 12. The plurality of gridwall structures 14 are spaced apart from each other. Preferably, the plurality of gridwall structures 14 are arranged at equal intervals. The film structure 14b includes first to Nth film layers. By selecting film layers of different thicknesses and different materials, the reflectivity of the film structure 14b facing the interface of the transparent gridwall 14a and the reflectivity of the film structure 14b facing away from the interface of the transparent gridwall 14a. Here, the interface defining the film structure 14b facing the transparent gridwall 14a is an inner surface of the film structure 14b, and the interface of the film structure 14b facing away from the transparent gridwall 14a is an outer surface of the film structure 14b.

In this embodiment, the reflectivity of the inner surface of the film structure 14b is higher, and the reflectivity of the inner surface of the film structure 14b is 800/to 99%, so that most of the light emitted from the backlight module 2 via the transparent gating 14a is reflected when it enters the inner surface of the film structure 14b, and finally enters the PDLC layer 13 to greatly improve the light energy utilization efficiency of the backlight module 2.

Preferably, the reflectivity of the outer surface of the film structure 14b is lower, and the reflectivity of the outer surface of the film structure 14b is 0.3% to 15%, so that most of the light emitted from the backlight module 2 via the PDLC layer 13 will be absorbed when it directly incident on the outer surface of the structure 14b. And, as the scattering characteristics of the PDLC layer 13 are enhanced, more and more light is incident on the outer surface of the film structure 14b, so that the brightness of the PDLC layer 13 in the scattering state is greatly reduced to increase the brightness difference of the display image in the scattering state and the transparent state, enhancing the contrast of the display image. Compared with increasing the contrast by increasing the thickness of the PDLC layer 13, the driving cost and power consumption can be reduced and the duration of the liquid crystal is extended.

Specifically, the material of the first film layer of the film structure 14b is a high reflectivity metal. For example, the material of the first film layer is one selected from the group consisting of aluminum, silver, gold and copper. The thickness of the first film layer is greater than 30 nm. The second to the Nth film layers of the film structure 14b are made of metal or insulating material, wherein the metal is selected from the group consisting of molybdenum, titanium and tantalum, while the insulating material is nitride or oxide. For example, the oxide includes $SiO_x$, ITO, IZO, $TiO_2$, $Ta_2O_5$, $MoO_x$, $WO_x$, and the nitrides include $SiN_x$ and $TiN_x$. Herein, the present embodiment is not limited to the listed materials, other similar materials may also be used as the material of the film layer of the film structure 14b.

The film structure 14b in the present embodiment will be described below by using three embodiment. However, these embodiments are only for better describing the structure of the film structure 14b and are not intended to limit the present disclosure.

First Embodiment

The film structure 14b includes first to third film layers. The first film layer is made of a high-reflectivity metal such as Al, Ag, Au, Cu or the like. The thickness of the first film layer is greater than 30 nm. The material of the second film layer is transparent material, such as $SiN_x$, $SiO_x$, ITO, IZO, $TiO_2$, $Ta_2O_5$ and so on. The thickness of the second film layer is 30~100 nm. The material of the third film layer is metal, such as Mo, Ti, Ta, and so on, and the thickness of the third film layer is 3~40 nm.

Second Embodiment

The film structure 14b includes first through fourth film layers. The first film layer is made of a high-reflectivity metal such as Al, Ag, Au, Cu or the like. The thickness of the first film layer is greater than 30 nm. The material of the second film layer and the fourth film layer is made of transparent material such as $SiN_x$, $SiO_x$, ITO, IZO, $TiO_2$, $Ta_2O_5$ and the like. The thickness of the second film layer and the fourth film layer is 30~100 nm. The material of the third film layer is metal, such as Mo, Ti, Ta and others, and the thickness of the third film layer is 3~40 nm.

Third Embodiment

The film structure 14b includes first to second film layers, the first film layer is made of a high-reflectivity metal such as Al, Ag, Au, Cu or the like, and the first film layer has a thickness greater than 30 nm; The material of the second film layer is metal oxide or metal nitride, such as $MoO_x$, $WO_x$, $TiN_x$, etc. The thickness of the second film layer is 5~70 nm.

Figure 3:
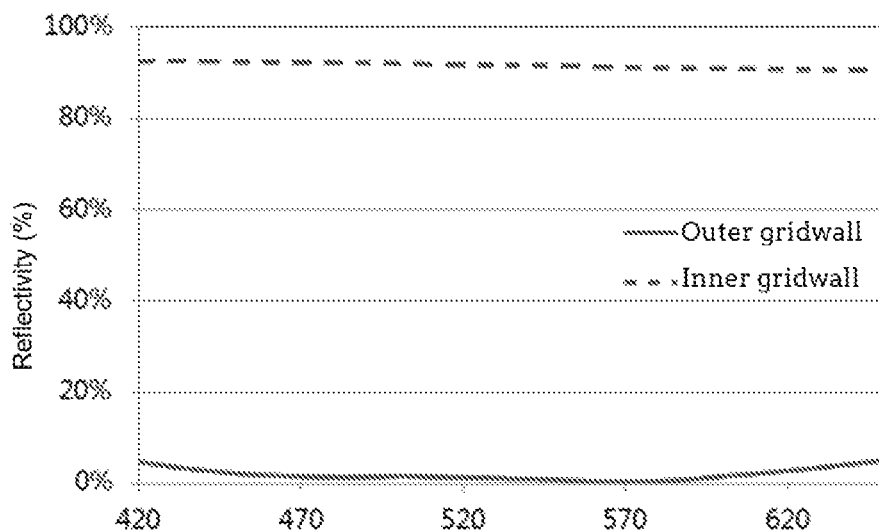
FIG. 3 is a schematic diagram of reflectivity of inner and outer surfaces of a film structure.

FIG. 3 shows that in the first embodiment, the material of the first film layer is Al with a thickness of 300 nm, the material of the second film layer is ITO with a thickness of 41 nm, and the material of the third film layer is Mo with a thickness of 5 nm. The reflectivity of the inner surface and the outer surface of the fill structure 14b, from which it can be seen that the reflectivity of the inner surface of the film structure 14b is greater than 91% and the reflectivity of the outer surface of the film structure 14b is less than 1.5%.

The transparent gridwall 14a is perpendicular to the first substrate 11 and the second substrate 12. In this embodiment, the transparent gridwall 14a is made of polyimide or polystyrene, and of course other transparent polymer materials could also be applied. The transparent gridwall 14a acts as a carrier for the film structure 14b and also supports the first substrate 11 to ensure the thickness uniformity of the PDLC layer.

The cross-section shape of the transparent gridwall 14a is trapezoid. For example, the shape of the transparent garing 14a is a frustum or a truncated cone, so that the angle between the side surface of the transparent gridwall 14a and the second substrate 12 is an acute angle, such that the light emitted from the backlight module 2 to the inner surface of the film structure 14b can be reflected back to the PDLC layer 13 more easily.

The foregoing contents are detailed description of the disclosure in conjunction with specific preferred embodiments and concrete embodiments of the disclosure are not limited to these description. For the person skilled in the art of the disclosure, without departing from the concept of the disclosure, simple deductions or substitutions can be made and should be included in the protection scope of the application.

What is claimed is:

1. A display panel comprising a first substrate, a second substrate, a polymer dispersed liquid crystal layer and a plurality of gridwall structures, wherein the first substrate and the second substrate are disposed opposite to each other, the polymer dispersed liquid crystal layer, the plurality of gridwall structures are disposed between the first substrate and the second substrate; the plurality of gridwall structures are spaced apart from each other in the polymer dispersed liquid crystal layer, and each of the gridwall structures comprises a transparent gridwall and a film structure covering a surface of the transparent gridwall; the film structure sequentially comprises a first to Nth film layers in a direction away from the transparent gridwall; the refractivity of any two adjacent film layers of the first to the Nth film layers are different, and the reflectivity of one surface of the film structure facing the transparent gridwall is higher than the reflectivity of one surface of the film structure facing away from the transparent gridwall.

2. The display panel according to claim 1, wherein the reflectivity of one surface of the film structure facing the transparent gridwall is 80% to 99%.

3. The display panel according to claim 2, wherein the reflectivity of one surface of the film structure facing away from the transparent gridwall is 0.3% to 15%.

4. The display panel according to claim 1, wherein the transparent gridwall is perpendicular to the first substrate and the second substrate.

5. The display panel according to claim 4, wherein the transparent gridwall has a trapezoidal cross-sectional shape.

6. The display panel according to claim 1, wherein a material of the first film layer is metal.

7. The display panel according to claim 6, wherein a material of the first film layer is one selected from the group consisting of aluminum, silver, gold and copper, and/or a thickness of the first film layer is greater than 30 nm.

8. The display panel according to claim 1, wherein a material of the second to Nth film layers is a metal or an insulating material, and/or the metal is selected from the group consisting of molybdenum, titanium and tantalum, and the insulating material is nitride or oxide.

9. The display panel according to claim 1, wherein a material of the transparent gridwall is polyimide or polystyrene.

10. A liquid crystal display device, comprising a display panel, wherein the display panel comprises a first substrate, a second substrate, a polymer dispersed liquid crystal layer and a plurality of gridwall structures, the first substrate and the second substrate are disposed opposite to each other, the polymer dispersed liquid crystal layer, the plurality of gridwall structures are disposed between the first substrate and the second substrate; the plurality of gridwall structures are spaced apart from each other in the polymer dispersed liquid crystal layer, and each of the gridwall structures comprises a transparent gridwall and a film structure covering a surface of the transparent gridwall; the film structure sequentially comprises a first to Nth film layers in a direction away from the transparent gridwall; the refractivity of any two adjacent film layers of the first to the Nth film layers are different, and the reflectivity of one surface of the film structure facing the transparent gridwall is higher than the reflectivity of one surface of the film structure facing away from the transparent gridwall.

11. The liquid crystal display device according to claim 10, wherein the reflectivity of one surface of the film structure facing the transparent gridwall is 80% to 99%.

12. The liquid crystal display device according to claim 11, wherein the reflectivity of one surface of the film structure facing away from the transparent gridwall is 0.3% to 15%.

13. The liquid crystal display device according to claim 10, wherein the transparent gridwall is perpendicular to the first substrate and the second substrate.

14. The liquid crystal display device according to claim 13, wherein the transparent gridwall has a trapezoidal cross-sectional shape.

15. The liquid crystal display device according to claim 10, wherein a material of the first film layer is metal.

16. The liquid crystal display device according to claim 15, wherein a material of the first film layer is one selected from the group consisting of aluminum, silver, gold and copper, and/or a thickness of the first film layer is greater than 30 nm.

17. The liquid crystal display device according to claim 10, wherein a material of the second to Nth film layers is a metal or an insulating material, and/or the metal is selected from the group consisting of molybdenum, titanium and tantalum, and the insulating material is nitride or oxide.

18. The liquid crystal display device according to claim 10, wherein a material of the transparent gridwall is polyimide or polystyrene.

* * * * *